(12) United States Patent
Lorenz

(10) Patent No.: US 7,521,822 B2
(45) Date of Patent: Apr. 21, 2009

(54) PROTECTION TECHNIQUES FOR A BACK-UP ELECTRIC POWER SYSTEM

(75) Inventor: Rick A. Lorenz, Ham Lake, MN (US)

(73) Assignee: Cummins Power Generation IP, Inc., Minneapolis, MN (US)

( * ) Notice: Subject to any disclaimer, the term of this patent is extended or adjusted under 35 U.S.C. 154(b) by 144 days.

(21) Appl. No.: 11/800,749

(22) Filed: May 7, 2007

(65) Prior Publication Data
US 2008/0277945 A1    Nov. 13, 2008

(51) Int. Cl.
*H02J 9/00*   (2006.01)
(52) U.S. Cl. ............................... 307/64; 307/65; 307/66
(58) Field of Classification Search ............. 307/64–66
See application file for complete search history.

(56) References Cited
U.S. PATENT DOCUMENTS

| | | | |
|---|---|---|---|
| 3,636,368 A | 1/1972 | Sia | |
| 4,208,693 A | 6/1980 | Dickens et al. | |
| 4,245,182 A | 1/1981 | Aotsu et al. | |
| 4,384,213 A | 5/1983 | Bogel | |
| 4,443,828 A | 4/1984 | Legrand et al. | |
| 4,589,052 A | 5/1986 | Dougherty | |
| 4,855,664 A | 8/1989 | Lane | |
| 4,912,382 A | 3/1990 | Koenig et al. | |
| 4,996,646 A | 2/1991 | Farrington | |
| 5,006,781 A | 4/1991 | Schultz et al. | |
| 5,117,174 A | 5/1992 | Kessler | |
| 5,168,208 A | 12/1992 | Schultz et al. | |
| 5,390,068 A | 2/1995 | Schultz et al. | |
| 5,592,393 A | 1/1997 | Yalla | |
| 5,642,002 A * | 6/1997 | Mekanik et al. | ............... 307/64 |
| 5,701,070 A | 12/1997 | Schultz | |
| 6,172,428 B1 | 1/2001 | Jordan | |

(Continued)

OTHER PUBLICATIONS

Department of the Army, Coordinated Power Systems Protection, Technical Manual TM 5-811-14 [on-line ], Feb. 1991 URL:<http://www.usace.army.mil/publications/armytm/tm5-811-14/>.

(Continued)

*Primary Examiner*—Albert W Paladini
(74) *Attorney, Agent, or Firm*—Krieg DeVault LLP; J. Bruce Schelkopf; L. Scott Paynter

(57) ABSTRACT

One embodiment of the present application is directed to a protection technique for a back-up electric power generation system. This system includes an electric power generator, generator control circuitry, electrical output sensors to provide one or more corresponding signals, electrical switching equipment to selectively couple the generator to an electrical load, and electric power feeder conductors to route electric power from the generator to the switching equipment. The control circuitry is responsive to the sensor signals to determine if a shut-down condition exists as a function of a protection profile determined for the system. This profile may account for damage thresholds of the generator, the feeder conductors, and the electrical switching equipment for each of a number of different combinations of level and duration of electrical output as represented by the sensor signals.

22 Claims, 5 Drawing Sheets

U.S. PATENT DOCUMENTS

| | | | |
|---|---|---|---|
| 6,175,166 B1 * | 1/2001 | Bapat | 307/64 |
| 6,563,234 B2 * | 5/2003 | Hasegawa et al. | 307/66 |
| 7,060,379 B2 * | 6/2006 | Speranza et al. | 429/9 |
| 7,382,063 B2 * | 6/2008 | Mullet et al. | 307/64 |
| 2004/0262997 A1 | 12/2004 | Gull et al. | |

OTHER PUBLICATIONS

Eaton, O & M, Manual for the ATC-400 Controlled Transfer Switch [online], Jun. 2003, URL:<http://www.eaton.com/ecm/idcplg?IdcService=GET_FILE&dID=3587>.

* cited by examiner

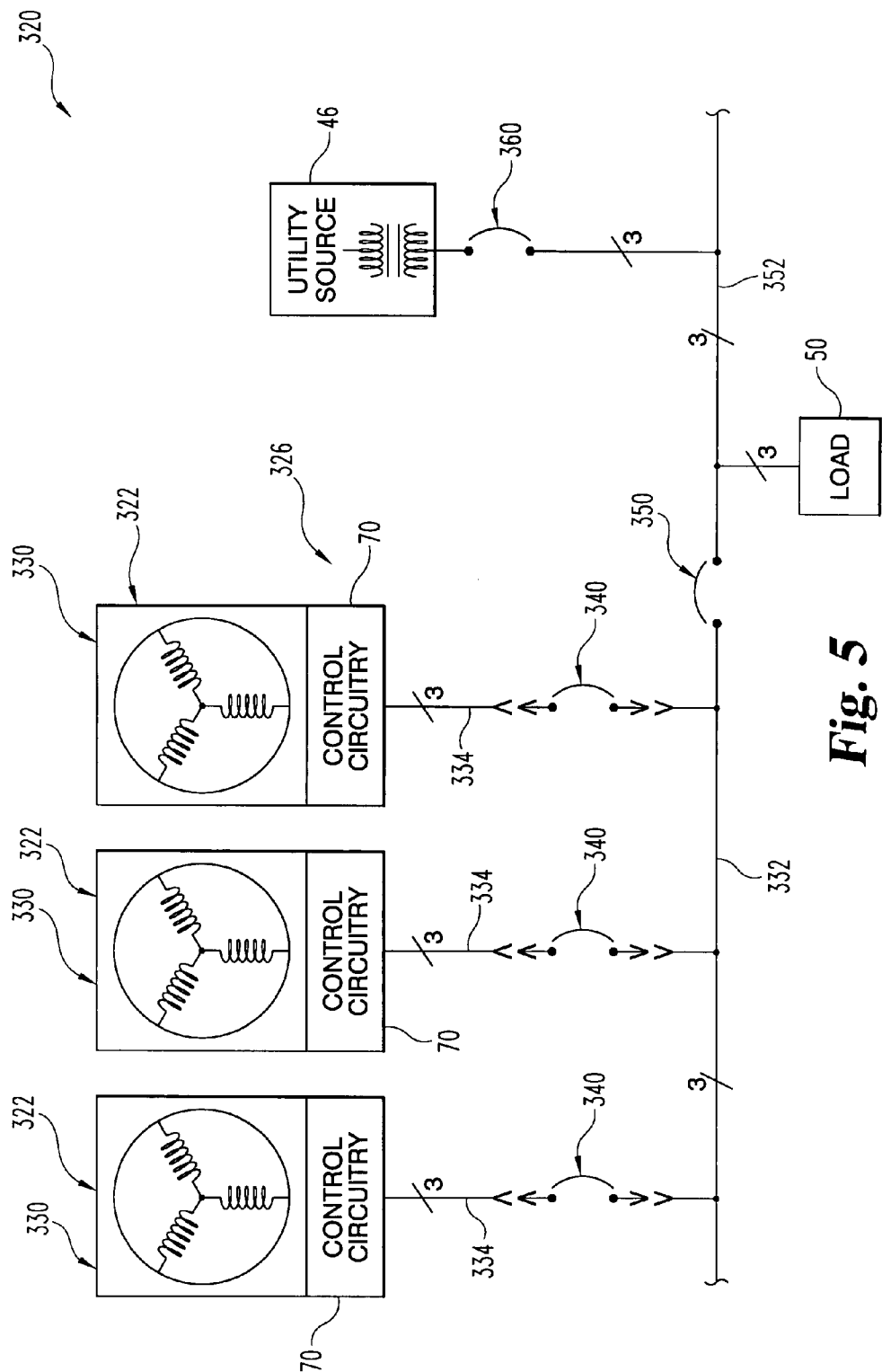

US 7,521,822 B2

PROTECTION TECHNIQUES FOR A BACK-UP ELECTRIC POWER SYSTEM

BACKGROUND

The present application relates to electrical power generation, and more particularly, but not exclusively to fault protection associated with back-up electric power systems.

Typically, circuit breakers are the primary protective device utilized for back-up electric power generator systems. In the event of a fault condition, such as excessive electrical current, the circuit breaker is opened. A given circuit breaker may be packaged with fault detection capability and/or depend on external inputs to indicate a fault has been detected. Under certain circumstances, circuit breakers may improperly open in response to transient conditions resulting in a false trip; and under other circumstances, there may be an attendant delay in opening the circuit breaker resulting in damage to a back-up generator, feeder conductors, or other equipment of the back-up system. Thus, there remains a need for further contributions in this area of technology.

SUMMARY

One embodiment of the present invention is a unique back-up electric power system protection technique. Other embodiments include unique methods, systems, devices, and apparatus involving electric power supply. Further embodiments, forms, objects, aspects, benefits, and advantages of the present invention shall become apparent from the figures and description provided herewith.

BRIEF DESCRIPTION OF THE DRAWING

FIG. 5 is a diagrammatic view of yet a further electric power system.

DETAILED DESCRIPTION OF REPRESENTATIVE EMBODIMENTS

Figure 1:
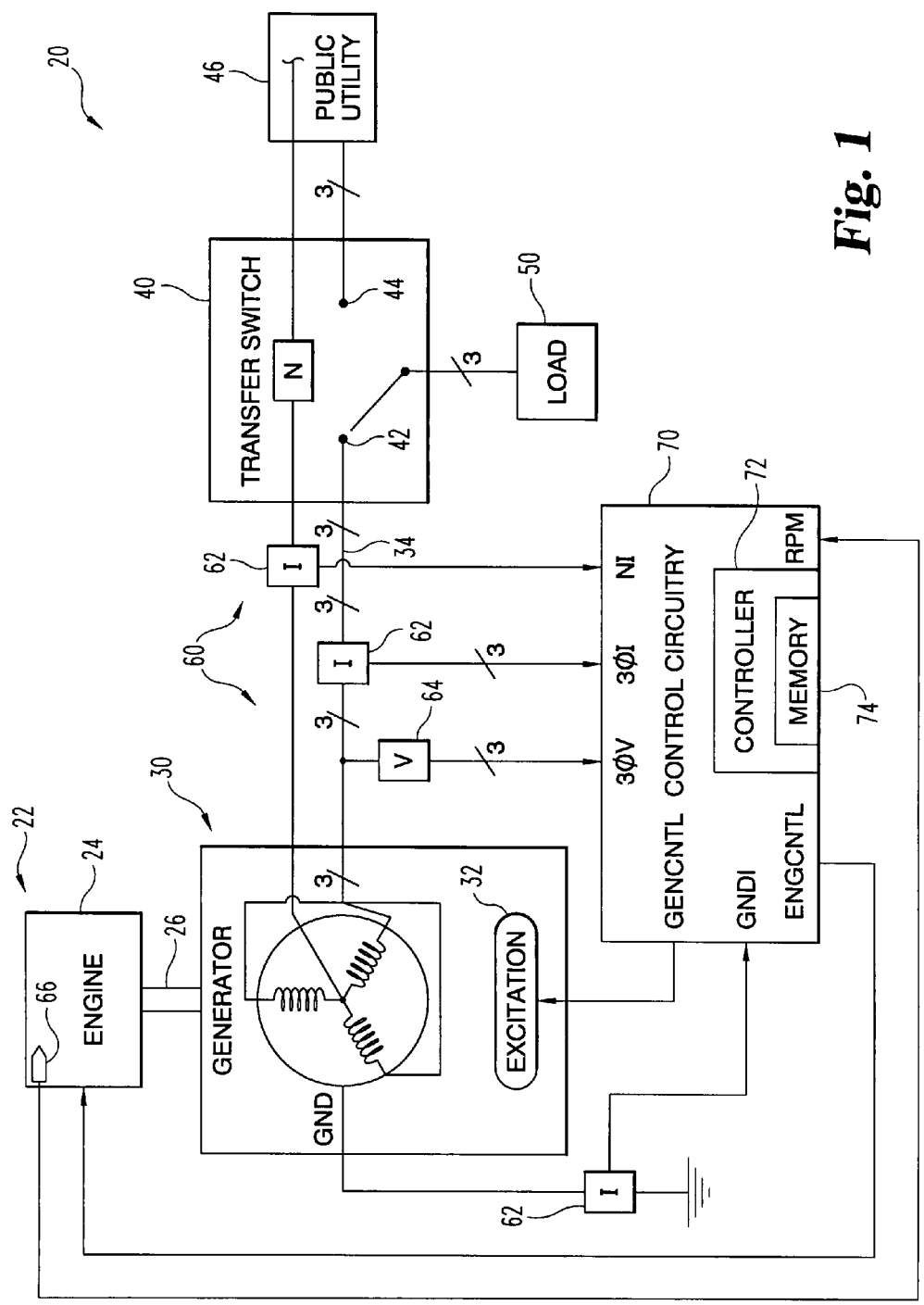
FIG. 1 is a diagrammatic view of an electric power system.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

One embodiment of the present application includes an electric power system with a back-up generator, a transfer switch, and feeder conductors coupling the generator and the transfer switch together. Also included is control circuitry that monitors electric output from the generator and halts generator operation if an undesirable condition is detected in this output. Examples of such a condition include an overvoltage, an undervoltage, a ground fault, undesired electric current flow in a neutral line, temperature, output harmonic distortion, frequency deviation, and an overcurrent just to name a few. Furthermore, the condition may be determined as a function of level (magnitude) and duration of the given property being monitored (voltage, current, temperature, or the like). In one particular, nonlimiting form, the condition is determined from a thermal damage curve determined in terms of time versus electric current level.

FIG. 1 depicts back-up electric power system 20 of a further embodiment of the present application. System 20 includes an electric power generation subsystem 22. Subsystem 22 includes a prime mover in the form of an internal combustion engine 24 and an alternator or electric power generator 30 to provide a three-phase, Alternating Current (AC), voltage at a target magnitude and frequency. Engine 24 provides rotational mechanical power to generator 30 with rotary drive mechanism 26. Mechanism 26 can be a direct drive member, a device that provides a nonunity turn ratio, a torque converter, a transmission, and/or a different form of rotary linkage as would occur to those skilled in the art. In one arrangement, engine 24 is of a reciprocating piston type that is diesel fueled. In other forms, engine 24, mechanism 26, and/or generator 30 can be of other types; engine 24 may be differently fueled; and/or a different form of prime mover can be used to provide mechanical power to generator 30 as an alternative or addition to engine 30. Such different forms of prime mover include a wind turbine, a hydraulic turbine, or a steam turbine, to name just a few possibilities.

Generator 30 includes excitation field windings 32 operatively coupled to control circuitry 70 to be further described hereinafter. The three-phase electric power output of generator 30 is coupled by feeder conductors 34 to power transfer switch 40. A neutral conductor "N" also interconnects generator 30 and switch 40. An electrical earth ground "GND" for generator 30 is also illustrated. Switch 40 includes three contacts 42 in electrical continuity with conductors 34 and three contacts 44 electrically coupled to public utility power source 46. Switch 40 is also connected to electrical load 50, and is structured to electrically couple contacts 42 to load 50 or contacts 44 to load 50 to alternatively provide power from subsystem 22 or public utility source 46. Accordingly, for this three-phase embodiment switch 40 operates as a triple pole, double throw type. Switch 40 can be of a standard type used in power switching applications, such as emergency power generation systems, stand-by power generation systems, or other types of back-up power sources; just to name a few representative examples.

System 20 further includes voltage sensors 64 to monitor magnitude of voltage output by generator 30 on conductors 34 and current sensors 62 that monitor magnitude of electric current flow through conductors 34, neutral (N), and ground (GND) in association with generator 30. Sensors 62 may be of a standard current transformer type or such other variety as would be known to those skilled in the art. Sensors 64 may be in the form of circuitry that samples a voltage drop across a known resistance or the like. Sensor 66 is of a standard type that provides a sensor signal representing rotational speed of engine 24. In some forms, this senor signal is representative of the frequency of the electric power output of generator 30; however, frequency can be determined using other techniques. Sensors 62-66 are converted to a digital form for processing using standard techniques. Alternatively or additionally, in other embodiments an analog form of sensor signal processing may be used.

System 20 further includes generator control circuitry 70 that may be provided with generator 30 as part of the power generation subsystem 22. In one particular form, engine 24, generator 30, and circuitry 70 are provided as an integral genset subsystem. Circuitry 70 includes inputs from current sensors 62 corresponding to the three phases of the electrical output of generator 30 designated as "3φI," any detected neutral current designated as "NI," and any detected electric earth ground current designated as "GNDI." Sensors 64 provide voltages corresponding to the three-phase electric output of generator 24 designated as ""3φV." The engine speed input from sensor 66 is designated as "RPM." Operation of engine 24 may be regulated via an Engine Control Module (ECM) (not shown) that is in turn responsive to control signals from control and inverter assembly 40 of system 28. Alternatively, some or all of the operation of engine 24 may be included in control circuitry 70 in lieu of a separate ECM.

Circuitry 70 includes controller 72 with memory 74. Controller 72 executes operating logic that defines various control, management, and/or regulation functions. This operating logic may be in the form of dedicated hardware, such as a hardwired state machine, programming instructions, and/or a different form as would occur to those skilled in the art. Circuitry 70 and/or controller 72 may be provided as a single component, or a collection of operatively coupled components; and may be comprised of digital circuitry, analog circuitry, or a hybrid combination of both of these types. Controller 72 can include multiple processing units arranged to operate independently, in a pipeline processing arrangement, in a parallel processing arrangement, and/or such different arrangement as would occur to those skilled in the art. When controller 72 is of a multi-component form, it may have one or more components remotely located relative to the others. In one embodiment, controller 72 is a programmable microprocessing device of a solid-state, integrated circuit type that includes one or more processing units and memory. In one form, controller 72 can include a computer network interface to facilitate communications using one or more standard communication protocols. Such an interface may be used to report system status information, receive sensor/detector inputs, operator input/output, communicate other data used in its operation, perform remote debugging or monitoring of circuitry 70, and/or to receive operating logic updates in the form of programming instructions or the like. It should be appreciated that one or more operator input controls, such as a keyboard, pointer, switches, or the like; and one or more operator outputs, such as a display, alarm, indicator, or the like can be included in subsystem 22 with appropriate interfacing to circuitry 70.

Memory 74 may be comprised of one or more types including semiconductor, magnetic, and/or optical varieties, and/or may be of a volatile and/or nonvolatile variety. In one form, memory 74 stores programming instructions executed by controller 72 of circuitry 70 to embody at least a portion of its operating logic. Alternatively or additionally, memory 74 stores data that is manipulated by the operating logic of controller 72. Circuitry 70 includes signal conditioners, modulators, demodulators, Arithmetic Logic Units (ALUs), Central Processing Units (CPUs), oscillators, control clocks, amplifiers, communication ports, delay devices, signal format converters (such as analog-to-digital and digital-to-analog converters), limiters, clamps, filters, power supplies, and the like as needed to perform various control, management, and regulation operations described in the present application.

In operation, circuitry 70 controls a number of aspects of subsystem 22, such as electronic governor control, automatic voltage regulation, regulated short circuit current, engine speed sensing, engine fault monitor, overload/overcurrent fault, neutral current fault, earth ground fault, short circuit fault, automatic synchronization with other AC power sources, permissive paralleling with other generators, paralleling control, over/undervoltage faults, remote metering and control, generator start-up control, output power calculation and display, reverse power fault, real power load sharing control during parallel operation, reactive power load sharing control during parallel operation, built-in self-diagnostics, and provision for external diagnostics equipment, just to name a few. Two common control functions are the regulation of the frequency of the generator output waveform typically by adjusting engine operation, and the regulation of the excitation of the field windings of the generator, which affects the output voltage of the generator. To control these two functions, various control models can be incorporated into the operating logic of controller 72, such as Proportional-Integral-Derivative (PID) controls. Further background concerning the application of this kind of approach for generator applications may be found in commonly owned U.S. Pat. No. 5,701,070 issued Dec. 23, 1997 and U.S. Pat. No. 5,006,781 issued Apr. 9, 1991, both of which are each incorporated by reference in its entirety.

Figure 2:
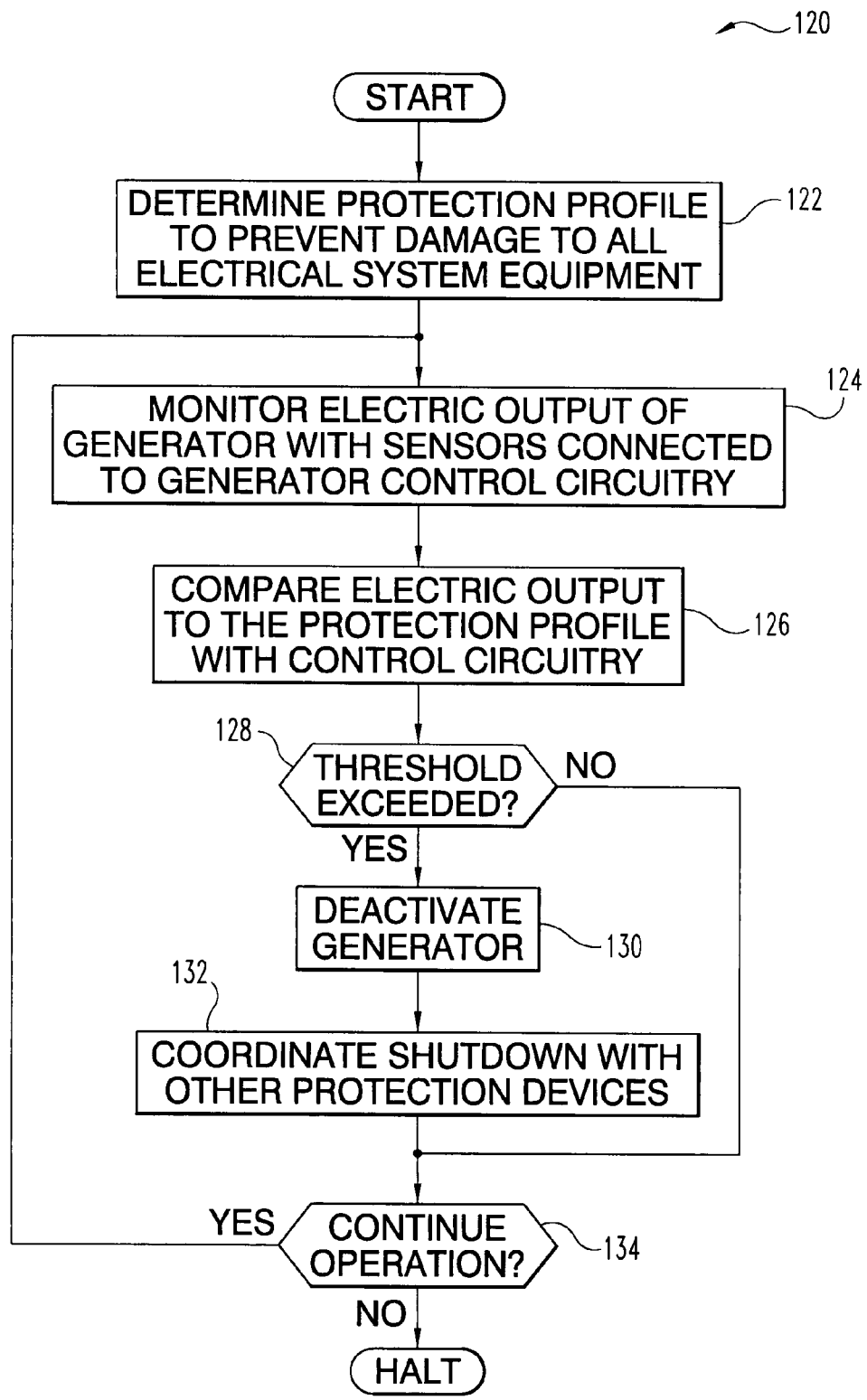
FIG. 2 is a flowchart of one procedure for operating the system of FIG. 1.

FIG. 2 illustrates control procedure 120 in flowchart form. Procedure 120 is executed with circuitry 70 and is embodied in the operating logic executed by controller 72. Procedure 120 starts with operation 122, which includes determining and selecting a protection profile to reference in later operations. This protection profile is established to protect various components of system 20 from damage and may be initially determined with controller 72 and/or stored in memory 74 as data that is accessed by controller 72. This data can be provided in one or more forms, such as tables, schedules, mathematical functions/definitions, and/or numerical relationships, to name a few. Surprisingly, it has been found that this type of profile can be used in lieu of circuit breakers between generator 30 and transfer switch 40. From a government regulatory and industry standards perspective, this "breakerless" approach is acceptable for many applications.

Figure 3:
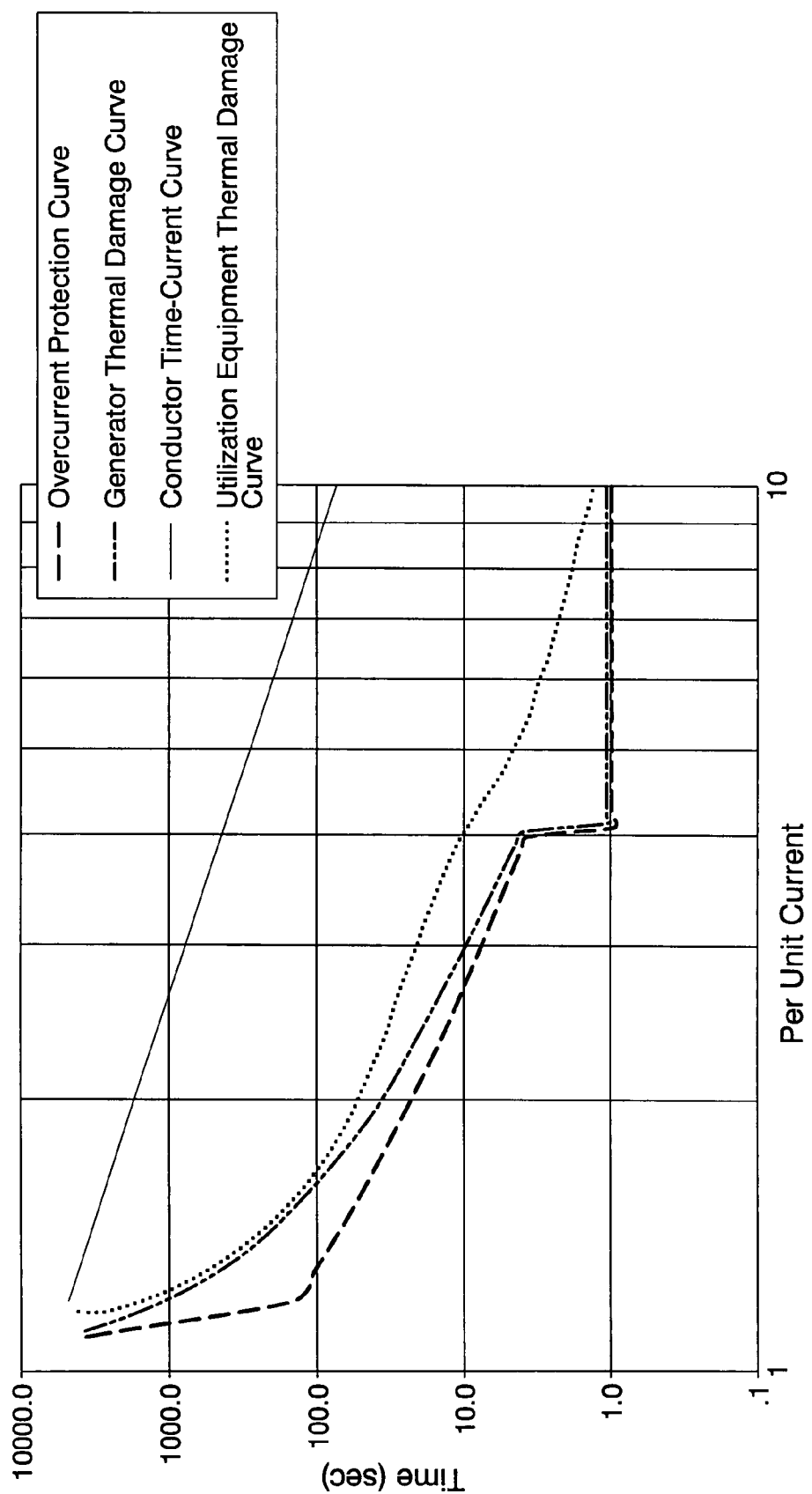
FIG. 3 is a graph illustrating thermal damage curves associated with various equipment included in the system of FIG. 1.

FIG. 3 graphically illustrates one example of a protection profile, being representative of the maximum thermal exposure permitted as a result of excessive electrical current. More specifically, this profile is in the form of an overcurrent thermal protection curve defined in terms of time versus per unit current. In other words, the thermal exposure (and hence any damage threat) varies not only with the electric current magnitude, but also with the duration of the current at a given magnitude. The thermal protection curve accounts for both these variables. In FIG. 3, the dashed line represents this protection curve and is structured such that it is less than or equal to any of the curves corresponding to other equipment of system 20. A few of these other curves are shown in FIG. 3, including the generator thermal damage curve resulting from excessive current exposure of generator 30 (chain line pattern), the conductor time-current curve for feeder conductors 34 (solid line), and the utilization equipment thermal damage curve which is representative of transfer switch 40 and other associated equipment when power is supplied to load 50 from generator 30 (dotted line). Accordingly, the overcurrent protection curve is a composite of the maximum tolerable current thresholds with respect to time for generator 30, feeder conductors 34, and transfer switch 40 in this example. It should be appreciated that a protection profile could be based on additional or alternative criteria. For example, other thresholds may be provided for generator electrical output over/undervoltage, electrical output frequency deviation (overfrequency and/or underfrequency), output harmonic distortion, temperature, ground current flow, and/or neutral current flow—to name a few possibilities. Furthermore, in at least some cases, governmental and/or industry standards may define certain protection thresholds and/or criteria that are used to define a given profile.

Procedure 120 advances from operation 122 to operation 124. Operation 124 includes monitoring the AC electrical output of generator 30 with sensors 62 and 64. Operation 124 may include monitoring of sensor 66 output as representative of the frequency of the generator electrical output, deriving such output frequency from sensors 62 and/or 64, and/or using different techniques. From operation 124, procedure 120 continues with operation 126 in which the electrical output from generator 30 as measured with sensors 62 and 64 is compared to the protection profile. In the case of the FIG. 3, the comparison involves both the total current magnitude and the duration indicated from the protection curve. Accordingly, this comparison includes recognizing current levels at or above the thresholds defined by the protection curve and timing a given level as appropriate. For the FIG. 3 example, the duration of per unit current over 100 is about 1 second, which may be implemented as the fastest possible shutdown for generator 30.

From operation 126, procedure 120 continues with conditional 128. Conditional 128 tests whether the corresponding threshold defined by the protection profile has been exceeded. If the test of conditional 128 is true (yes), then operation 130 is reached. In operation 130, generator 30 is deactivated. This deactivation can be implemented in a number of different ways. In one example, circuitry 70 sends an engine control signal to engine 24 via output ENGCNTL to halt operation of engine 24 and correspondingly halt operation of generator 30. Alternatively or additionally, circuitry 70 sends a control signal to halt excitation of windings 32 via output GENCNTL. The deactivation of generator 30 in accordance with the time requirements of the protection curve provides protection for not only generator 30, but also feeder conductors 34 and transfer switch 40 without need of a circuit breaker. Correspondingly, electrical continuity between generator 30 and transfer switch 40 is not disrupted by the protective action taken. However, it should be appreciated that in other embodiments, one or more circuit breakers may be present and optionally may be tripped to provide further protection.

From operation 130, procedure 120 continues with operation 132 which provides for the coordinated shutdown of other protection devices if present. Such activities may include changing the status of transfer switch 40 and/or protection devices between transfer switch 40 and load 50 (not shown) to mention a couple of examples. Coordination could also include the orderly switchover to source 46 from generator 30. From operation 132, conditional 134 is reached. Conditional 134 is also reached directly, bypassing operations 130 and 132, when the test of conditional 128 is negative (no). Conditional 134 tests whether to continue procedure 120. If the test of conditional 132 is affirmative (yes), then procedure 120 halts. If the test of conditional 134 is affirmative (yes), then procedure 120 returns to operation 124 to repeat operations 124 and 126, and conditional 128, and optionally operations 130 and 132 depending on conditional 128.

Figure 4:
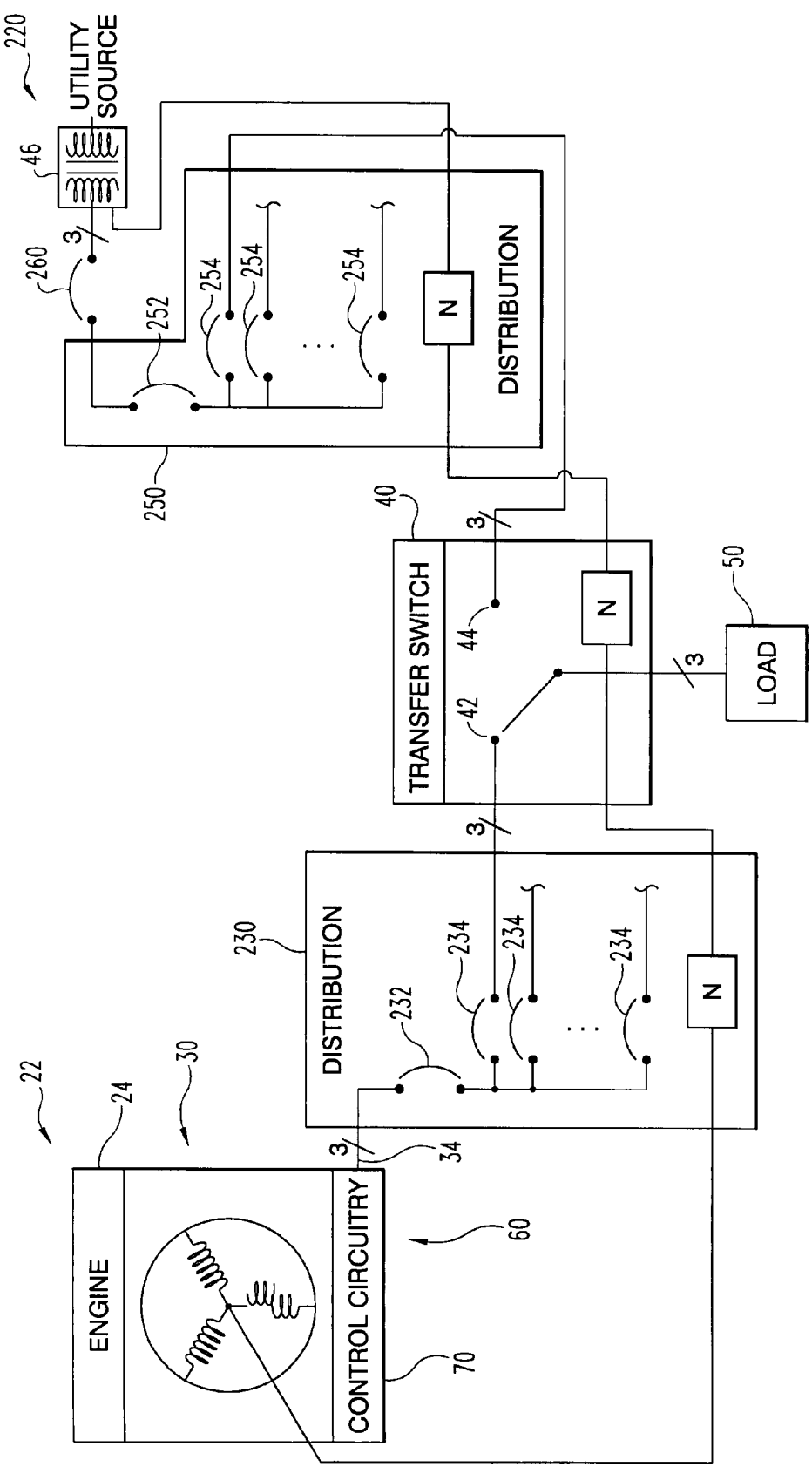
FIG. 4 is a diagrammatic view of another electric power system.

FIG. 4 illustrates electrical system 220 of another embodiment of the present application; where like reference numerals refer to like features previously described. System 220 includes subsystem 22 with engine 24, generator 30, and circuitry 70. In system 220, subsystem 22 including feeder conductors 34 that are interconnected to transfer switch 40 through distribution panel equipment 230. Subsystem 22 also includes sensors 62, 64, and 66 as previously described, which are not shown to preserve clarity. Equipment 230 includes main circuit breaker 232 and branch circuit breakers 234. One of branch breakers 234 is connected to contacts 42 of transfer switch 40 to route electric power from subsystem 22 to load 50 in a back-up capacity to public utility source 46. Correspondingly, source 46 is coupled to contacts 44 by distribution panel equipment 250. Equipment 250 includes main circuit breaker 252 and branch circuit breakers 254, one of which being electrically connected to transfer switch 40 to selectively route electrical power thereto.

Procedure 120 of FIG. 3 can be executed with system 220 as previously described. Equipment 230 and 250 includes protective devices of the type subject to coordinated control in operation 132 in the event of a shutdown that deactivates generator 30. Such coordination may include opening the breaker 234 to disconnect contacts 42 from generator 30 and/or coordinating a change in state of transfer switch 40 and/or closure of breakers 254 connected to contacts 44.

FIG. 5 illustrates electrical system 320 of a further embodiment of the present application; where like reference numerals refer to like features previously described. System 320 includes a number of electric power generation subsystems 322 each having electric output sensors of the type previously described (not shown), an engine or other prime mover (not shown), generator 330, and circuitry 70. Generator 330 may be any of the types previously described, such as generator 30, or of a different type.

Subsystems 322 are arranged for selective parallel operation to provide a corresponding parallel back-up power source 326. Source 326 also includes power bus 332, generator feeder conductors 334 and power breaker/switches 340. Each generator 330 of system 320 can be connected and disconnected selectively to parallel power bus 332 by corresponding feeder conductors 334 through a respective power breaker/switch 340. Source 326 is selectively connected to load 50 via load bus 352 by power breaker/switch 350, that is in turn connected to bus 332. Alternatively, load 50 can be powered by utility source 46 by the closure of power breaker/switch 360 connected to load bus 352.

In operation, for each subsystem 322, circuitry 70 monitors electric output of the respective generator 330 to determine if a shutdown condition in accordance with procedure 120 of FIG. 2 has occurred. If a shutdown condition occurs, then the corresponding generator 330 is deactivated. Further, the coordination of other protective devices per operation 132 typically includes opening the respective power breaker/switch 340 to disconnect the corresponding subsystem 322 from bus 332. Power breaker/switch 340 may be under the control of the respective circuitry 70. In this manner, each power generation subsystem 322 can be selectively placed in parallel operation with the other subsystems 322 as desired. Coordination may also include logic to assure that only one of switches 350 and 360 are closed at the same time and/or otherwise provide for the orderly transfer of load 50 (and bus 352) between the power sources 46 and 326. Such coordination may be embodied in circuitry 70 of each subsystem 322, only one or fewer of them, and/or reside in a master controller/circuit (not shown).

Many further embodiments of the present application are envisioned. For example, in other embodiments a temperature sensor is connected to circuitry 70 and its corresponding temperature sensor signal is used as a parameter with or without other input for comparison to a protection profile utilized in the procedure of FIG. 2. In still other examples, control circuitry 70 is configured to include a number of different profiles for different equipment that can be manually or automatically determined. Thus, common control circuitry could be used for a number of different generators, feeder conductors, and transfer switch arrangements.

A further example of an embodiment of the present application includes: operating a back-up electrical power system including a power generator and a power transfer switch with a first input coupled to the generator by feeder conductors and a second input coupled to a utility power source; providing electrical power to an electrical load from the generator through the transfer switch; monitoring an electrical output of a generator during the providing of the electrical power to the load; and from the level and duration of the electrical output determining a shut-down condition from a protection profile for the back-up electrical system; and in response to this condition, halting operation of the generator. The protection profile may correspond to a relationship between the level and duration of the electrical output and represents the lowest damage threshold of the generator, the feeder conductors and the transfer switch at each of the number of different combinations of the level and duration of the electrical output.

Another example includes a back-up electrical power system with a generator, power transfer switch and a first input coupled to the generator by feeder conductors and a second input to the transfer switch coupled to a utility power source. Also included are: means for providing electrical power to an electrical load from the generator through the transfer switch, means for monitoring electrical output of the generator during the providing of the electrical power to the electrical load, and means for determining a shut-down condition as a function of the level and duration of the electrical output and a protection profile for the back-up electrical system. This protection profile corresponds to a relationship between the level and the duration of the electrical output, and represents the lowest damage threshold for the generator, the feeder conductors, and the transfer switch at each of the number of different combinations of the level and duration of the electrical output. Furthermore, the back-up electrical power system includes means for halting operation of the generator in response to the shut-down condition.

In one nonlimiting form, the electrical output being monitored is electrical current and the profile corresponds to an overcurrent protection curve for different levels and duration of current.

Still another example includes: operating a back-up electrical power system including a power generation subsystem with an electrical power generator and control circuitry, and a power transfer switch with a first input electrically coupled to the generator by one or more feeder conductors and a second input electrically coupled to a utility power source; supplying electrical power from the generator to the transfer switch; monitoring electrical output of the generator during the supplying of the electrical power; determining a shutdown condition with the control circuitry; and in response to the shutdown condition, halting operation of the generator while maintaining electrical continuity between the generator and transfer switch.

Yet a further example includes a back-up electrical power system including a power generation subsystem with an electrical power generator and control circuitry. The system also includes a power transfer switch with a first input electrically coupled to the generator by one or more feeder conductors and a second input electrically coupled to a utility power source. Also included in the system are means for supplying electrical power from the generator to the transfer switch, means for monitoring electrical output of the generator during the supplying of the electric power, means for determining a shutdown condition with the control circuitry, and means for halting operation of the generator while maintaining electrical continuity between the generator and the transfer switch in response to the shutdown condition.

Another example is directed to an apparatus, comprising: a back-up electric power generation system including an electric power generator, generator control circuitry, one or more electric output sensors to provide one or more sensor signals to the control circuitry representative of electric output of the generator, electrical switching equipment to selectively couple the generator to an electrical load, electrical power feeder conductors to allow electric power from the generator to the switching equipment, and in which the control circuitry is responsive to the one or more sensor signals to determine if a shutdown condition exists as a function of a system protection profile. This profile is representative of an overcurrent threshold of the generator, the feeder conductors, and the electrical switching equipment for each of a number of different combinations of current level and duration. The control circuitry is structured to generate an output signal when the shutdown condition exists and the generator is responsive to this signal to halt operations.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary. While the invention has been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein or by any of the following claims are desired to be protected.

What is claimed is:

1. A method, comprising:
    operating a back-up electrical power system including a power generator and a power transfer switch with a first input coupled to the generator by feeder conductors and a second input coupled to a utility power source;
    providing electrical power to an electrical load from the generator through the transfer switch;
    monitoring electrical output of the generator during the providing of the electric power to the electrical load;
    from the level and duration of the electrical output, determining a shutdown condition from a protection profile for the back-up electrical system, the protection profile corresponding to a relationship between the level and the duration of the electrical output, the protection profile representing the lowest damage threshold for the generator, the feeder conductors, and the transfer switch at each of a number of different combinations of the level and the duration of the electrical output; and
    in response to the shutdown condition, halting operation of the generator.

2. The method of claim 1, which includes maintaining the electrical continuity of the feeder conductors to the generator and the transfer switch during the halting of the generator.

3. The method of claim 1, wherein the electrical output corresponds to electrical current provided by the generator and the protection profile is representative of an overcurrent protection curve.

4. The method of claim 1, wherein the electrical power is provided in a three phase form with a neutral conductor and the monitoring of the electrical output includes sensing a neutral electrical current through the neutral conductor and a ground electrical current through to an electrical ground of the generator.

5. The method of claim 4, which includes stopping operation of the generator if at least one of the neutral electrical current and the ground electrical current exceeds a threshold.

6. The method of claim 1, which includes configuring the transfer switch to route electricity from the utility power source to the electrical load in response to the shutdown condition.

7. The method of claim 1, wherein a protective device is provided between the generator and the transfer switch and further comprising changing state of the protective device to provide an electrical discontinuity between the generator and the transfer in response to the shutdown condition.

8. The method of claim 1, wherein the generator is one of multiple generators structured to operate in parallel to provide electricity to the transfer switch and each of the multiple generators is selectively coupled to a common power bus by a circuit switch device.

9. A method, comprising:
operating a back-up electrical power system including a power generation subsystem with an electric power generator and control circuitry, and a power transfer switch with a first input electrically coupled to the generator by one or more feeder conductors and a second input electrically coupled to a utility power source;
supplying electrical power from the generator to the transfer switch;
monitoring electrical output of the generator during the supplying of the electric power;
determining a shutdown condition with the control circuitry; and
in response to the shutdown condition, halting operation of the generator while maintaining electrical continuity between the generator and the transfer switch.

10. The method of claim 9, wherein electrical output includes electrical current, and the determining of the shutdown condition includes comparing the electrical current to an overcurrent protection profile for the back-up electrical system, the protection profile corresponding to a relationship between overcurrent level and overcurrent duration, the protection profile representing the lowest damage threshold for the generator, the feeder conductors, and the transfer switch at each of a number of different combinations of the overcurrent level and the overcurrent duration of the electrical output.

11. The method of claim 9, wherein the determining of the shutdown condition includes detecting one or more of a ground fault, an overvoltage condition, and an undervoltage condition.

12. The method of claim 9, wherein the electrical power is provided in a three phase form with a neutral conductor and the monitoring of the electrical output includes sensing a neutral electrical current through the neutral conductor and a ground electrical current through to an electrical ground of the generator.

13. The method of claim 12, which includes stopping operation of the generator if at least one of the neutral electrical current and the ground electrical current exceeds a threshold.

14. The method of claim 9, which includes configuring the transfer switch to route electricity from the utility power source to the electrical load in response to the shutdown condition.

15. An apparatus, comprising: a back-up electric power generation system including:
an electric power generator;
generator control circuitry;
one or more electric output sensors to provide one or more sensor signals to the control circuitry representative of electric output of the generator;
electrical switching equipment to selectively couple the generator to an electrical load;
electric power feeder conductors to route electric power from the generator to the switching equipment; and
the control circuitry being responsive to the one or more sensor signals to determine if a shutdown condition exists as a function of an overcurrent protection profile, the overcurrent protection profile being representative of an overcurrent damage threshold of the generator, the feeder conductors, and the electrical switching equipment for each of a number of different combinations of overcurrent level and overcurrent duration, the control circuitry being structured to generate an output signal, the generator being responsive to the output signal to halt operation.

16. The apparatus of claim 15, further comprising an internal combustion engine mechanically coupled to the generator to provide rotary power thereto.

17. The apparatus of claim 16, wherein the control circuitry includes means for regulating generator operation that is responsive to rotational speed of the engine.

18. The apparatus of claim 15, wherein the generator is one of multiple generators coupled in parallel and each connected to a common power bus by a circuit switch and the electrical switching equipment is a transfer switch structured to select between the generator and one or more other power sources.

19. The apparatus of claim 15, wherein the electrical switching equipment includes a circuit switch.

20. The apparatus of claim 15, further comprising means for protecting the back-up electric power generation system in response to one or more of a ground fault, an overvoltage condition, and an undervoltage condition.

21. The apparatus of claim 15, wherein the generator includes three outputs of different phase and is coupled to a neutral conductor and further includes a first current sensor to detect electrical current flow through the neutral conductor and a second current sensor to detect electrical ground current.

22. The apparatus of claim 15, wherein the electrical switching equipment includes a transfer switch to route electricity from a utility power source to the electrical load in response to the shutdown condition.

* * * * *